United States Patent [19]
Wycherley et al.

[11] Patent Number: 5,163,081
[45] Date of Patent: Nov. 10, 1992

[54] AUTOMATED DUAL-PARTY-RELAY TELEPHONE SYSTEM

[75] Inventors: Bruce D. Wycherley, Wanamassa; Daniel J. Yaniro, Jr., Middletown, both of N.J.

[73] Assignee: AT&T Bell Laboratories, Murray Hill, N.J.

[21] Appl. No.: 609,353

[22] Filed: Nov. 5, 1990

[51] Int. Cl.$^5$ .......................... H04M 3/50; H04M 3/58
[52] U.S. Cl. ........................................ 379/52; 379/88; 379/89; 379/201; 379/265; 379/212
[58] Field of Search ....................... 379/52, 67, 88, 89, 379/100, 201, 265, 266, 212

[56] References Cited

U.S. PATENT DOCUMENTS

| | | | |
|---|---|---|---|
| 2,500,630 | 3/1950 | Davis et al. | 179/100.3 |
| 3,704,345 | 11/1972 | Coker et al. | 179/1 SA |
| 4,932,042 | 6/1990 | Baral et al. | 379/100 |
| 4,935,954 | 6/1990 | Thompson et al. | 379/89 |
| 4,959,855 | 9/1990 | Daudelin | 379/88 X |
| 4,972,461 | 11/1990 | Brown et al. | 379/112 X |
| 4,996,707 | 2/1991 | O'Malley et al. | 379/100 |
| 5,014,303 | 5/1991 | Velius | 379/88 |
| 5,033,088 | 7/1991 | Shipman | 379/88 |

FOREIGN PATENT DOCUMENTS

| | | | |
|---|---|---|---|
| 3615661 | 11/1987 | Fed. Rep. of Germany . | |
| 0134568 | 8/1983 | Japan | 379/52 |
| 0162059 | 6/1989 | Japan | 379/52 |
| 2183880 | 6/1987 | United Kingdom | 379/52 |

OTHER PUBLICATIONS

"Comments" before FCC, in the Matter of Access to Telecommunications Equipment and Services by the Hearing Impaired . . . , Docket No. 87-124, dated Jul. 26, 1988.

"Bellcore's Telecommunications Network for the Deaf", Digest of Technical Information, Bell Communications Research, Feb. 1990, W. R. Terhune, pp. 1-7.

Primary Examiner—James L. Dwyer
Assistant Examiner—Harry S. Hong
Attorney, Agent, or Firm—F. B. Luludis

[57] ABSTRACT

A facility is provided for automating dual party relay service so that the cost of such a service may be reduced. The desired result is achieved by automating particular features of dual party relay service to appreciably decrease the amount of time that a service attendant is involved in a dual party relay call. Such automation is obtained by employing text-to-speech processing, and, on a limited basis, automatic speech recognition.

22 Claims, 3 Drawing Sheets

AUTOMATED DUAL-PARTY-RELAY TELEPHONE SYSTEM

FIELD OF THE INVENTION

The invention relates to a dual party relay service that is used to establish a telephone call between a sound impaired person and a person who is not so impaired, and more particularly relates to automating certain aspects of such a service.

BACKGROUND OF THE INVENTION

Dual Party Relay (DPR) service is a service that allows a sound-impaired (i.e., hearing or speech impaired) individual to communicate, via a telephone connection, with an individual who is not so impaired. An impaired individual may do this by dialing a particular telephone number(s) to establish a connection to a so-called DPR attendant who is trained to "translate" and relay the ensuing conversation.

In particular, a hearing-impaired person may place a telephone call to a DPR center via a device commonly referred to as a Telecommunications Device for the Deaf (TDD). A TDD has an alphanumeric keyboard and either a full screen or a single line character display, and employs either BAUDOT or ASCII signaling or both. The hearing-impaired person (hereinafter also referred to as TDD user) operating the TDD keyboard enters a text message, which is transmitted via a telephone connection and displayed at an attendant console. An attendant positioned at the console transmits via a separate telephone connection to the unimpaired person an oral version of the displayed text message. The attendant then listens to and enters via a console keyboard for transmission via the telephone connection to the TDD for display thereat a text message corresponding to the unimpaired person's oral response. The attendant continues such translation services for the duration of the DPR telephone call.

More specifically, if the TDD user can speak but cannot hear, then a switching state referred to as "Voice CarryOver" (VCO) allows that TDD user to speak directly to the unimpaired person. If, on the other hand, the TDD user can hear but cannot speak then a switching state referred to as "Hearing CarryOver" (HCO) allows that TDD user to receive speech directly from the unimpaired person. In the first instance, the attendant translates the unimpaired person's verbal response into text for the benefit of the hearing impaired TDD user, and in the second instance, the attendant translates the TDD user's text message into speech for benefit of the unimpaired person.

It can be appreciated from the foregoing that the cost of a DPR telephone call is not insignificant, since the aforementioned translation service is labor intensive.

It has been suggested that a Text-To-Speech (TTS) synthesizer and possibly automatic speech recognition, could be employed to perform such translation services, thereby decreasing the amount of time an attendant is involved in serving DPR calls, and thereby decreasing the cost of such calls. The way in which a TTS synthesizer and/or automatic speech recognition could be employed in a dual party relay system is not obvious, and the implementation of either one of those features is not a trival task.

Currently, large interexchange carriers offer a number of so-called enhanced services, such as, for example, electronic mail services, which store a voice and/or textual message and then, at a later time, forward the message to an identified recipient. However, sound impaired persons cannot take advantage of such enhanced services. The reason for this is that such services typically require a caller to respond to prerecorded verbal instructions to invoke the respective service.

SUMMARY OF THE INVENTION

An advance in provisioning dual party relay service is obtained by, in accordance with the invention, employing a network architecture, which in combination with automatic call distribution, text-to-speech processing, data networking and, on a limited basis, automatic speech recognition, decreases appreciably the amount of time that an attendant is involved in a dual party relay call. In addition, the inventive architecture may be adapted to extend to sound impaired persons the advantages offered by enhanced services, such as voice mail service. In particular, text provided by a sound impaired person is first stored in memory, and then translated into speech for processing by an enhanced service.

Further, the inventive architecture may be adapted to accommodate a partially impaired person who can hear but cannot speak, and who desires to personally listen to the response of the called speaker, in which case the impaired person is multiplexed between a text-to-speech synthesizer and the telephone connection extending to the called party. The inventive architecture may be similarly adapted to handle the opposite case in which the impaired person can speak but cannot hear.

DETAILED DESCRIPTION

Figure 1:
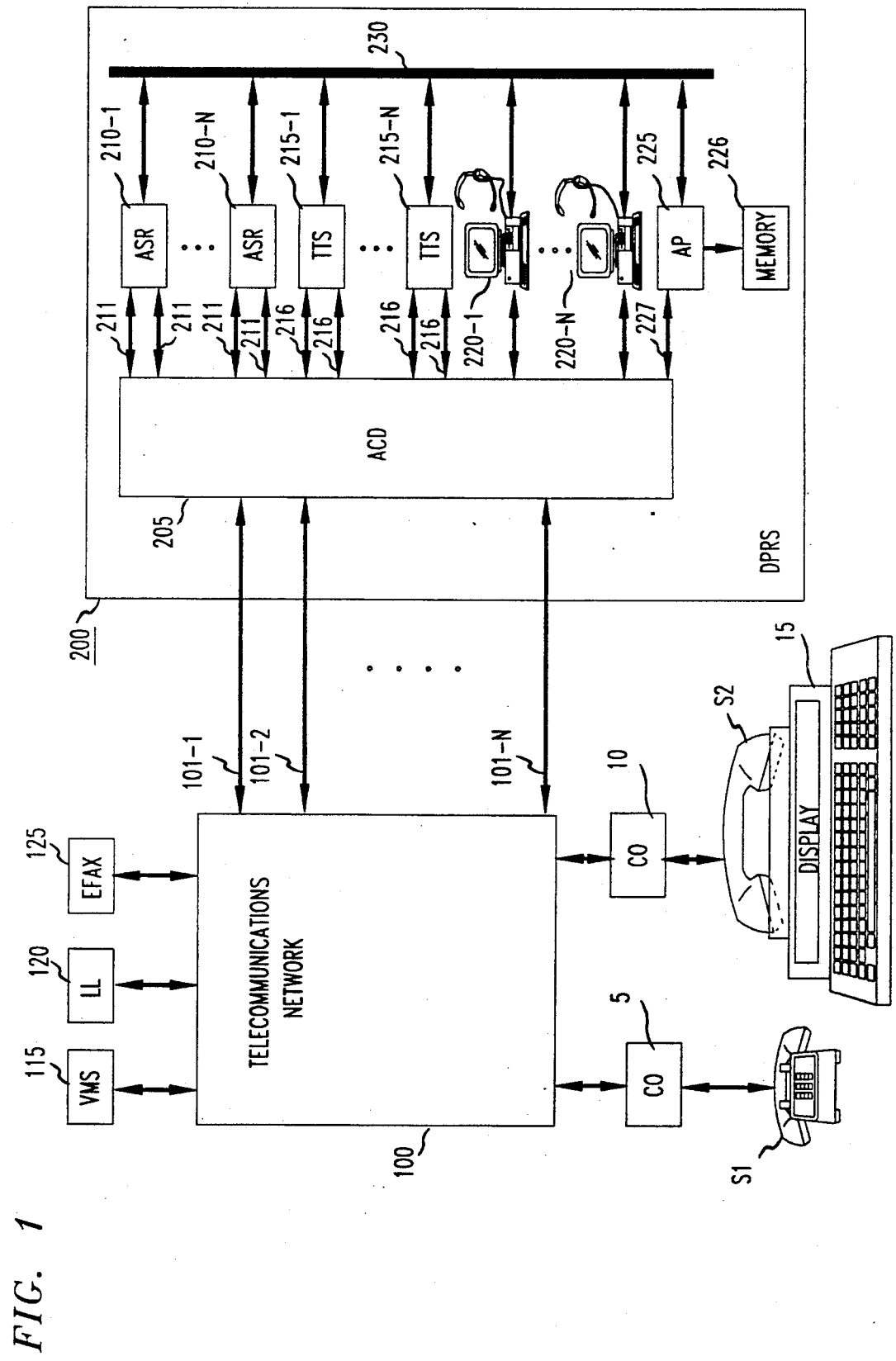
FIG. 1 shows a broad block diagram of a telecommunications system in which the principles of the invention may be practiced.

Turning now to FIG. 1, there is shown a broad block diagram of Dual Party Relay System (DPRS) 200 coupled to a telecommunications network 100, which may be, for example, the well-known AT&T network. As is well-known, the AT&T network comprises a plurality of so-called toll switches (not shown) interconnected with one another to provide long distance telephone and data services for its subscribers, such as the subscribers associated with stations S1 and S2.

AT&T also provides for its subscribers a number of special services, such as, for example, (1) a Voice Messaging Service (VMS) 115, which stores and forwards to an intended destination a voice message and which is commonly referred to as the VoiceMark (service mark of AT&T) messaging service; (2) a language translation service 120 for subscribers who do not speak the English language, which service is referred to as Language Line (LL), and (3) an enhanced facsimile service (EFAX) 125, which stores and forwards to an intended destination a digital message (i.e., facsimile message). The manner in which a subscriber, e.g., the subscriber associated with station S1, establishes a telephone connection to any one of the foregoing services or to another subscriber served by network 100 is well-known and will not be discussed herein. However, it suffices to say that a subscriber positioned at station S1 may establish such a connection by causing station S1 to go "off-hook" and then dialing a respective telephone number. The local Central Office (CO) 5 associated with station S1 collects the telephone digits as they are dialed and establishes a connection to an associated toll switch (not shown) contained in network 100. The toll switch, in turn, and based on the dialed telephone number that it receives from CO 5, establishes a network 100 connection to a so-called destination toll switch. The destination toll switch then extends the connection to the desired location. If the dialed telephone number is associated with one of the aforementioned services, then the destination toll swith extends the connection to the desired service. If, on the other hand, the dialed telephone number is associated with another subscriber, then the destination switch extends the connection to a CO associated with that subscriber. The latter CO then extends the connection to the telephone station (not shown) associated with the other subscriber.

Each of the services 115, 120 or 125 interacts with a subscriber by transmitting to the latter via a respective network 100 connection prerecorded verbal instructions. For example, in the case of services 115 and 125, the subscriber is verbally instructed to enter, inter alia, the telephone number of the destination that is to receive a message that the subscriber intends to send. The service then instructs the subscriber to enter the message, voice or facsimile as the case may be. In the case of the language translation service 120, the subscriber is verbally instructed to enter the identity of the language that is to be translated.

It is apparent that as a result of such interaction a sound-impaired person cannot take advantage of the enhanced services provided by network 100. Accordingly, a hearing-impaired person cannot arrange to have either a voice or facsimile message stored and then forwarded to an intended recipient. In addition, a sound-impaired person cannot communicate via a telephone connection with a person unfamiliar with the English language.

We have recognized these and other limitations and have designed a Dual Party Relay System (DPRS) having an architecture that is geared toward allowing a TDD user, in accord with an aspect of the invention, to advantageously use such services. Moreover, the architecture of our DPRS partially automates a dual party relay call by employing text-to-speech synthesis to significantly decrease attendant involvement, thereby significantly reducing the cost of the dual party relay service. In addition, the architecture of our DPRS, in accord with an aspect of the invention, employs what we call independent and dependent Speech-To-Text Synthesis (STTS) using Automatic Speech Recognition (ASR) means that is based on predetermined speech recognition templates.

In particular, DPRS 200 includes Automatic Call Distributor (ACD) 205, a plurality of Automatic Speech Recognition (ASR) units 210-1 through 210-N, a plurality of Text-to-Speech Synthesis (TTS) Units 215-1 through 215-N, a plurality of attendant terminals 220-1 through 220-N, an Applications Processor (AP) 225 and associated memory 226. As will be discussed below, the ASR units, TTS units, attendant terminals and applications processor may communicate with one another via Local Area Network (LAN) 230, which may be, for example, the Datakit (registered trademark of AT&T) virtual circuit network available from AT&T.

ACD 205, which may be, for example, a so-called private branch exchange, such as the System 85 communications system available from AT&T, interfaces DPRS 200 with network 100. That is, ACD 205, inter alia, operates in a conventional manner to distribute incoming calls received via network 100 among the attendants positioned at terminals 220-1 through 220-N. ACD 205 also operates in a conventional manner to establish via network 100 a telephone connection associated with a call originated at one of the terminals 220-1 through 220-N, as will be discussed below.

Figure 2:
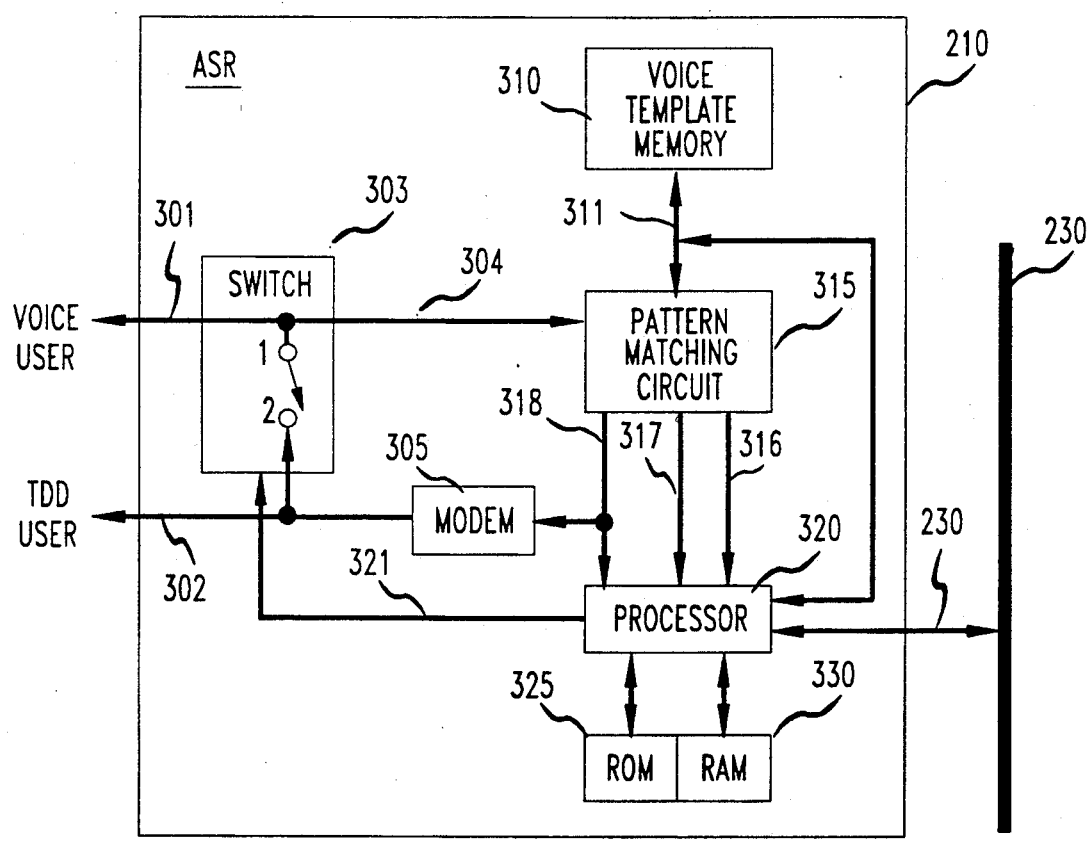
FIG. 2 shows a block diagram of the automatic speech recognition unit of FIG. 1.

ASR units 210-1 through 210-N are identical to one another and provide a switching capability between a TDD user and an unimpaired speaker. That is, each ASR unit connects to two ACD 205 port circuits via a respective communication path 211. As shown in FIG. 2, one of the two ports connects the ASR to the TDD user via communication path 302 (also referred to herein as ASR port 2), ACD 205 and network 200. The other ACD 205 port connects the ASR to the unimpaired speaker via communication path 301 (also referred to herein as ASR port 1), ACD 205 and network 100. Each ASR unit may be, for example, a Conversant (registered trademark of AT&T) voice system that is available from AT&T. The Conversant voice system is disclosed in the *AT&T Technical Journal*, September-/October 1986, Volume 65, Issue 5, Robert J. Perdue and Eugene L. Rissanen, entitled Conversant 1 Voice System: Architecture and Applications, AT&T Technical Journal, September/October 1986, Volume 65, Issue 5, which is hereby incorporated by reference.

Each ASR is also arranged to recognize particular words characterized herein as speaker independent and speaker dependent speech recognition. Speaker dependent recognition is used in the instance in which a particular speaker has developed (i.e., "pretrained") a so-called voice template that DPRS 200 may use to recognize a limited vocabulary of words that may be uttered by the speaker. Such pretraining involves an off-line training session in which the particular speaker in communication with a voice processor enunciates each word or appropriate "pieceparts" thereof, of a limited vocabulary of words and does so until the voice processor develops a template which enables the voice processor to recognize each such word when it is uttered by the speaker during an actual call. The template constitutes a digital version and ASCII coded version of each of the limited vocabulary of words and is stored in memory 226 at a location associated with the speaker. Thereafter, and at the time that the speaker is connected to ASR port 1, AP 225 loads the unimpaired speaker's associated voice template into voice template memory 310.

Speaker independent recognition is based on a common template or set of templates which enables an ASR unit to recognize particular phrases, commonly referred to as key words, received from any speaker. The combination of key words should be chosen so that they are not likely to be spoken in an ordinary sentence. For example, the words "star over" ("*over") form a unique combination that is unlikely to be contained in a speaker's response. Such key words prompts the associated ASR to switch from its present ASR configuration to a particular operating configuration referred to herein as "carryover", as will be discussed below.

As seen from FIG. 2, ASR unit 210 also includes a pattern matching circuit 315 which is connected to ASR port 1. Analog signals representing a word uttered by the unimpaired speaker and presented to the input of circuit 315 are converted into a digital pattern (signals) using a conventional analog-to-digital converter. Appropriate digital features are then extracted from the pattern using a digital signal processor (not shown). Circuit 315 then matches (compares) such features with digital patterns of respective words forming the limited vocabulary template memory stored in voice template memory 310. If a match is found, then circuit 315 passes an ASCII coded version of the digitized word to modem 305 for transmission to the TDD user via ASR port 302.

If a match is not found, then, circuit 315 notifies processor 320 of that fact via lead 316. Processor 320, as directed by its associated DPRS program stored in ROM 325, increments a respective software counter stored in RAM memory 330, as a means of tracking the number of mis-matches that occur over the course of the current conversation. Processor 320 then compares the value contained in the counter with a predetermined threshold. If that value exceeds the predetermined threshold, then processor 320 causes circuit 315 to pass to modem 305 an appropriate message—illustratively—"excessive translation errors"—for transmission to the TDD user via port 302. In addition, Processor 320, in accordance with an aspect of the invention, terminates automatic speech recognition by sending to AP 225 via LAN 230 a message requesting the intervention of an attendant. AP 225, in turn, sends to ACD 205 via communication path 227 a number of so-called third-party call control messages requesting that ACD 205 transfer the voice caller to an available attendant's voice station. ACD 205 responsive thereto and in a conventional manner reconfigures the call as requested. In doing so, ACD 205 transfers the call to an available attendant terminal and brings up on the associated display the particulars associated with the call, e.g., identity of the parties, their respective telephone numbers, etc.

At that point, the attendant may request that the speaker repeat the substance of his or her response. As the speaker does so, the attendant types in via the terminal keyboard each word that is uttered by the speaker for transmission to the TDD terminal connected to the call. At the end of the speaker's response, the attendant sends to AP 225 via LAN 230 a message requesting that control of the call be transferred to the TDD terminal. As discussed below, AP 225 responsive thereto notifies ACD 205 that the connection between the TDD call and attendant terminal is terminated so that terminal may be made available to serve other TDD calls.

Continuing with FIG. 2, pattern matching circuit 315 also compares the digital pattern of adjacent received words with the aforementioned common template to determine if it compares with the above-mentioned key word of "star over". If the comparison is found to be true, then circuit 315 notifies processor 320 via lead 316. If the TDD user had selected the option to use voice carryover (i.e., the TDD user can speak but cannot hear, and opted to speak directly to the unimpaired speaker and had so notified the attendant at the time of setting up the TDD call), then processor 320 responsive to such notification causes terminals 1 and 2 of switch 303 to be connected to one another to establish a bridged connection between ASR ports 1 and 2. As will be discussed below, this switching configuration is similarly characterized as a "carryover" state, which allows the TDD user to speak directly to the unimpaired speaker.

As a feature of the invention, pattern matching circuit 315 implements a timer which is started at the end of a received word and which is stopped at the beginning of the next received word. This is done to cover the case where the unimpaired speaker fails to utter the aforementioned keyword, or the uttered keyword is not detected or recognized, so that control of the connection may be passed to the TDD user. Thus, if the value of the timer reaches a predetermined threshold—illustratively 10 seconds—, then, in that event circuit 315 signals (notifies) processor 320 via signaling path 317. Similarly, responsive to receipt of that signal, processor 320 outputs to path 302 via lead 318 and modem 305 for delivery to the TDD and display thereat a message characterizing the aforementioned key words, e.g., "star over", or "*over.

Upon seeing the aforementioned key words displayed at the TDD, the TDD user may then enter via the TDD keyboard a response. As the TDD user enters a character it is transmitted via the telephone connection to ACD 205 for delivery to the respective TTS unit that may be involved in the call.

Returning to FIG. 1, TTS units 215-1 through 215-N are also identical to one another and each such unit connects to two ACD 205 port circuits via respective communication paths 216. One of the two ports connects its associated TTS unit to the TDD terminal via a path including ACD 205 and network 200. The other port connects the associated TTS unit to the unimpaired speaker via a similar path. A TTS unit connected to a TDD user via the aforementioned path receives digitally encoded text which an impaired user enters ("types in") via the keyboard of his or her TDD unit. Such text is then passed to a conventional text-to-speech synthesizer, which may be, for example, the *Olive-Liberman Synthesizer*, J. P. Olive and M. Y. Liberman, 1985, Text-To-Speech-An Overview, Journal of the Acoustic Society of America, Supplement 1 78, S6, which is hereby incorporated by reference.

Figure 3:
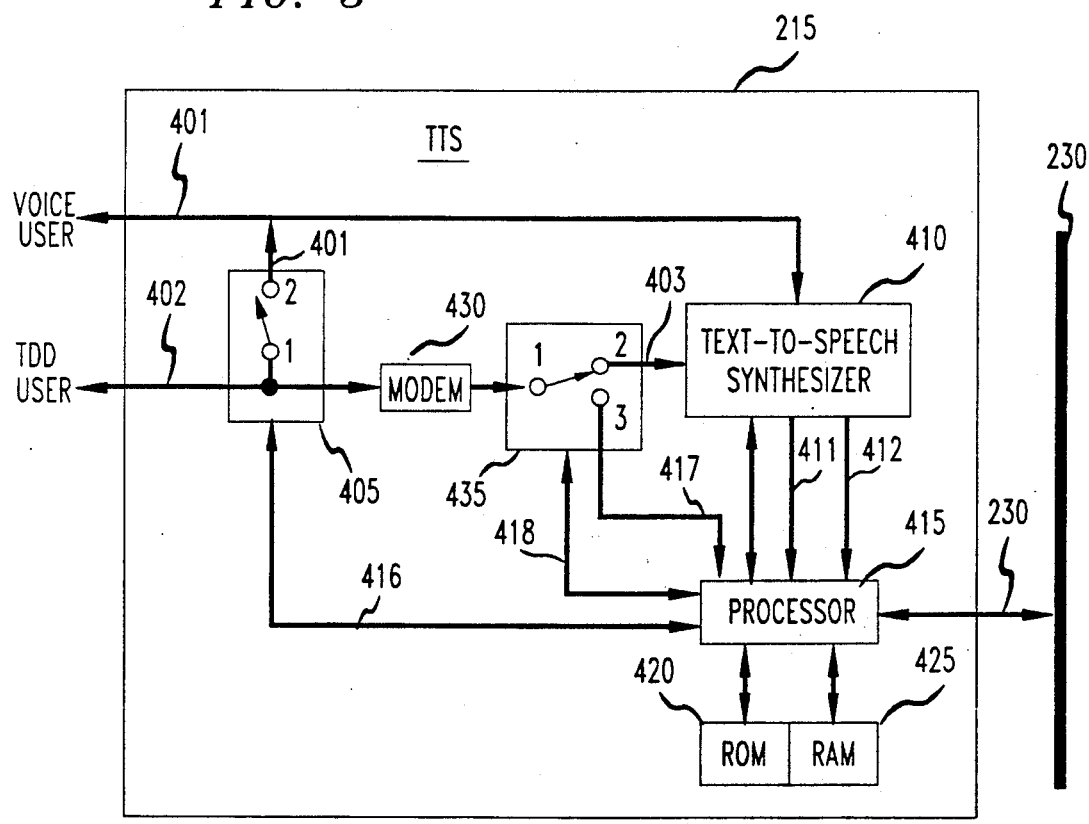
FIG. 3 shows a block diagram of the text-to-speech unit of FIG. 1.

Turning now to FIG. 3, there is shown a block diagram of a TTS unit 215. TTS unit 215 includes Text-to-Speech Synthesizer (TSS) 410, processor 415, modem 430 and multiplexed switches 405 and 435. ROM 420 and RAM 425 are associated with processor 415. It is seen that TSS unit 410 has one connection to TTS port 1 (designated 401 in the FIG.) and another connection to terminal 2 of switch 435. The former connection extends TSS 410 to the unimpaired speaker, as mentioned above, and the latter connection extends TSS 410 to one port of modem 430 via terminal 1 of switch 435. The other port of modem 430 connects to terminal 1 of switch 405.

TSS unit 410 may be bypassed by interconnecting terminals 1 and 2 of switch 405 to establish a direct connection between ports 1 and 2 of the TTS unit. In addition, an input 417 to processor 415 may be extended to port 2 via terminals 1 and 3 of switch 435, and modem 430. Processor 415 controls the operation of switches 405 and 435 and may cause either switch to change an electrical connection extending from one associated terminal to another associated terminal by "toggling" either lead 416 or 418, respectively.

In a TTS configuration, as characterized by a connection between terminals 1 and 2 of switch 435, TDD text received via port 2 is presented to the input of TTS 410 via modem 430. TTS 410 converts into synthesized analog speech each textual word that it receives via that connection and then presents the result to TTS port 1 (path 401) for delivery to the unimpaired speaker via ACD 205 and network 100.

In addition, each TTS unit 215-1 through 215-N is arranged to compare each pair of adjacent textual words with a predetermined digital template to determine if the words are equivalent to the aforementioned predetermined key words (e.g., "star over", or "*over") indicative of the end of a response originated by the TDD user. If the comparison is true, then TTS 410 notifies processor 415 via lead 412. Processor 415, in turn, and under the direction of an associated program stored in ROM 420, sends to AP 225 via LAN 230 an appropriate message requesting the intervention of an attendant. AP 225, in turn, sends to ACD 205 a number of third party call control messages requesting that ACD 205 transfer the voice call to an available attendant's voice station. ACD 205 selects an available attendant terminal and associates the terminal voice station with port 1 of the pertinent TTS unit. In addition, ACD 205 sends to AP 225 via bus 227 the identity of the selected attendant terminal. AP 225, in turn, sends to processor 415 via LAN 230 a message containing the identity of associated attendant terminal.

Responsive to receipt of that message, processor 415 "toggles" lead 418 to establish a connection between terminals 1 and 3 of switch 435 to extend processor connection 417 to modem 430. In this way, processor 415 extends the TDD call, via LAN 230, to the required attendant data terminal previously identified by AP 225. As a result of this call configuration, the attendant listens to the voice user and enters into the associated terminal the corresponding text. The attendant terminal forms strings of such text into respective messages containing the identity of the pertinent TTS and transmits each message to LAN 230. Processor 415 of the associated TTS unit removes each such message from LAN 230 and sends the text portion thereof to modem 430 via the aforementioned connection. Modem 430, in turn, modulates such text in a well-known fashion for transmission to the TDD user terminal via switch 405, ACD 205 and network 200.

(It is noted that the reason for transporting text messages via a backbone path including LAN 230 is to maintain the modem carrier signal transmitted between the TDD terminal and modem 230. As is well-known, if the TDD terminal is a so-called ASCII terminal, then the loss of such a carrier signal would cause both modem 430 and the ASCII terminal to terminate the telephone connection. However, the maintenance of the carrier signal is not applicable in the case where the TDD is a so-called BAUDOT terminal.)

Continuing, when the unimpaired speaker utters the keyword "star over", indicating the end of his/her latest response, then the attendant handling the call sends to ACD 205 a request to reconnect the voice user to port 1 of the pertinent TTS unit. Responsive thereto, ACD 205 reconnects the voice, or unimpaired, user as requested and then notifies AP 225 via path 227 of that fact. AP 225, in turn, sends to processor 415 via LAN 230 a message requesting that the TTS unit reconfigure itself for text-to-speech processing. Processor 415 implements the request by respectively toggling leads 416 and 418 to interconnect terminals 1 and 2 of switch 435, thereby returning the call to the TDD configuration, as discussed above.

If the call involves an ASR unit, then the TDD-to-voice portion of the call uses a TTS unit while the associated voice-to-TDD portion of the call uses an ASR unit. Specifically, and assuming that the state of the call is at a point where processor 415 has notified AP 225 that the aforementioned keyword has been received from the TDD user, then AP 225 in accordance with the associated call record stored in memory 226 (FIG. 1) sends to ACD 205 a message requesting that ACD 205 transfer the voice portion of an the call to port 1 (301) of available ASR unit 210 (FIG. 2). ACD 205 responsive to receipt of the message transfers the unimpaired speaker's ACD 205 connection from port 1 of the pertinent TTS unit 215 to port 1 of the available ASR unit 210. In addition, ACD 205 notifies AP 225 of the identity of the selected ASR unit 210. Referring now to FIGS. 2 and 3, armed with that information, AP 225 sends to processor 415 via LAN 230 a message identifying processor 320 and sends to processor 320 via LAN 230 a message identifying processor 415.

Processor 415 responsive to receipt of the message causes terminals 1 and 2 of switch 435 to be connected to one another. As a result of this configuration, speech received via port 1 of the ASR unit is presented to pattern matching circuit 315 which then outputs to bus 318 an equivalent digitized version of the received speech (text). Processor 320, in turn, collects the digitized speech, and forms it into a data packet containing the address of the pertinent TTS unit 215 and presents the packet to LAN 230 for delivery to the latter unit.

The TTS unit 215 upon receipt of the packet strips off the header containing, inter alia, its address (identity), and forwards the remainder of the packet to ACD 205 via modem 430 and the aforementioned switch 405 and 435 connections. In this call configuration, referred to as "ASR Configuration", the voice user speaks and the ASR unit converts this speech to text for transmission to the TDD user via the LAN and TTS unit.

As a result of this reconfiguration, the voice call is connected directly from ACD 205 to ASR unit 210 and the TDD call is connected from ACD 205 to ASR unit 210 via a backbone connection including TTS unit 215, LAN 230, and ASR processor 320. As mentioned above, this "indirect" TDD configuration is necessary to avoid loss of the modem carrier signal, and hence the TDD call, if the TDD terminal is an ASCII terminal rather than a Baudot terminal.

The call flow reverts to the aforementioned TSS configuration when pattern matching circuit 315 receives the aforementioned keyword, e.g., "star over" and notifies processor 320 accordingly. In that event then, processor 320 sends to AP 225 via LAN 230 a message indicative of that fact. AP 225 then sends to ACD 205 via bus 227 a message requesting that ACD 205 transfer the unimpaired speaker's voice call to port 1 of TTS 215. Similarly, ACD 205 upon completing the transfer notifies AP 225 of that fact. AP 225 then notifies processor 415 of the pertinent TTS unit 215. Processor 415 then causes terminals 1 and 2 of the associated switch 435 to be interconnected to one another to establish the aforementioned TTS configuration.

TTS unit 220 is also arranged to start a timer upon receipt of the last character of a digitized word and to stop and clear the timer upon receipt of the first character of an incoming digitized word. This is done to cover the case in which a TDD user fails to enter the key word or phrase. If the value of the timer reaches a predetermined threshold—illustratively 15 seconds— prior to receipt of the first character of a next digitized word, then the respective TTS unit considers the event to be indicative of the end of a TDD response. In that event then, processor 415 puts into effect the aforementioned carryover state, or mode, by causing the call to be transferred to either an available ASR unit 210 or attendant terminal, the case may be.

Returning to FIG. 1, attendant positions, or terminals, 220-1 through 220-N are the means for establishing in a conventional manner dual party relay connections between a TDD terminal user and a called station. An attendant positioned at one such terminal establishes such a connection by sending to ACD 205 what are commonly referred to a third-party call control signals. Briefly, a TDD user positioned at a TDD terminal, e.g., terminal 15, and using station set S2 dials the telephone number assigned to DPRS 200 and then places the S2 handset in the TDD terminal acoustic coupler. CO 10 and network 100 responsive to the dialed digits establish a connection to ACD 205 and pass the calling telephone number thereto. ACD 205 then extends the connection to an available TTS unit, e.g., unit 215-1, and supplies to AP 225 via connection 227 the calling telephone number. AP 225, in turn, selects an idle attendant terminal, e.g., terminal 220-1, and extends the connection of the TDD user to terminal 220-1 via LAN 230 and TTS unit 215-1. The attendant at terminal 220-1, and responsive to receipt of the call, enters, via the terminal keyboard, a inquiry requesting the telephone number of the called station. The inquiry is transmitted to TDD 15 via the established connection and is displayed on the TDD 15 display. Responsive to the request, the TDD user enters, via the TDD keyboard, the digits of the telephone number of the telephone station that the TDD user desires to call, e.g., station S1.

The attendant then requests entry of other call particulars, such as whether text-to-speech (TSS) processing ought to be used to decrease attendant involvement in the call. The digits of the called number entered by the TDD user as well as the results of the entry of aforementioned call particulars are displayed on the display of attendant terminal 220-1. If text-to-speech processing is not used (i.e., the TDD user indicated that TSS processing should not be used), then the remainder of call is handled in a conventional fashion, in which the attendant is bridged onto the connection for the duration of the call to orally translate TDD text into speech and vice-versa.

Under those circumstances, then, the attendant sends to ACD 205 a signal indicative of a request for an ACD 205 outgoing port circuit connected to network 100. When that connection is established, as indicated by dial tone, then the attendant dials the digits of the called telephone number. Assuming that those digits define the telephone number assigned to station S1, then network 100, in a conventional manner, establishes a connection to CO 5, which then extends the connection to station S1 and applies a ringing signal thereto in order to alert the user positioned at station S1. In addition, the attendant sends to AP 215 via LAN 230, a message containing the telephone numbers of the called and calling parties and other billing information (e.g., calling card number). AP 215 stores such numbers in a billing record contained in memory 226.

In addition, if ASR has been requested, then AP 215 "checks to see" if memory 226 contains a voice template associated with the called telephone number. If such a template is stored in memory 226, then AP 215 returns to the attendant terminal, e.g., terminal 220-1, via LAN 230 for display thereat a message verifying that fact and containing the identity (name) of the person associated with the template as well as an address, i.e., memory address, assigned to the template.

Armed with that information, the attendant sends to the TDD terminal for display a message advising the TDD user that automatic speech recognition may be used in conjunction with the call for the person associated with the identified template. If the TDD user desires such processing, then automatic speech recognition is employed if the person who answers the call is associated with the identified template. Accordingly, when the called party answers the call and the attendant determines that that person is associated with the identified voice template, then the attendant will advise the called party that automatic speech processing may be employed. The attendant then sends to ACD 205 a request to connect the called party to port 1 of an available ASR unit. The attendant then disconnects from the call.

If ASR is not used, then the attendant handles the call in a conventional fashion, i.e., manually. Thus, Following the foregoing, the attendant sends to the TDD terminal the aforementioned key words "star over" (or another suitable phrase) to inform the TDD user that the called party has answered the call. The attendant then causes ACD 205 to transfer the called party to port 2 of the connected TTS unit 215, and then disconnects from the call.

The TDD user may then begin entering text, which is transmitted via network 100 and ACD 205 to port 2 of the connected TTS unit 215 for translation into speech signal, in the manner discussed above, in which the resulting speech signals are then supplied to port 1 of the connected TSS unit 215 for delivery to the called speaker via ACD 205, network 100 and CO 5. When the TDD user enters the aforementioned keyword (*over) and the keyword is detected by the associated TTS unit, then, in the manner discussed above, an attendant terminal, not necessarily the attendant terminal involved in setting up the call, is connected to the call via LAN 230 and selected TTS unit 215 so that the attendant thereat may translate the called speaker's words into text for delivery to the TDD terminal. As before, when the last word of the called speaker's response has been so translated, then the attendant turns control of the call over the TDD user by entering via the attendant terminal the key words "*over". The foregoing call processing actions continues in the described manner until the calling TDD user and/or called speaker disconnects from the call. At that time, ACD 205 terminates the call and sends to AP 225 via communication path 227 a message indicative of that fact so that the associated billing record stored in memory 226 may be completed.

As an aspect of the invention, a TDD user who can speak but cannot hear may invoke a calling state option referred to above as "speaker carryover" if the TDD terminal is a BAUDOT terminal. Specifically, and referring once again to FIG. 2, if the TDD user invokes speaker carryover, then the control messages entered by the attendant causes the unimpaired speaker and TDD user to be respectively connected to ports 1 and 2 of an available ASR unit 210. In addition, and in the manner noted above, AP 225 sends to processor 320 of the selected ASR 210 the unimpaired speakers voice template as well a message identifying that call as "speaker carryover". Upon receipt of that message, processor 320 "toggles" switch 303 to insure that terminals 1 and 2 thereof are disconnected from one another and sends to the TDD terminal via port 2 (302), ACD 205 and the aforementioned connection a message containing the predetermined keyword. Processor 320 then toggles switch 303 to cause terminals 1 and 2 thereof to be connected to one another, thereby establishing a "speaker carryover" connection between ports 1 and 2 of the selected ASR 210.

In addition, processor 320 sends to pattern matching circuit 315 via bus 311 a message requesting that the latter circuit employ a speaker independent template to recognize receipt of the predetermined keyword. Accordingly, then, the TDD user may begin to speak in which the speech signals are received via port 2 and transferred to port 1 via switch 303. In addition, circuit 315 monitors the speech signals and compares, in the manner discussed above, each pair of received words with the speaker independent template. When circuit 315 detects receipt of the predetermined keyword, it then notifies processor 320 via lead 316. Processor 320, in turn, causes terminal 1 and 2 of switch 303 to be disconnected from one another to prepare for automatic speech recognition. In addition, processor 320 notifies circuit 315 to employ the speaker dependent template for translating speech into text. Accordingly, then, circuit 315 operates in the manner discussed above when speech received via port 1 is presented to the input of circuit 315, which then translates the speech into text using the speaker's voice template and then supplies the text to modem 305 for delivery to the TDD terminal.

When circuit 315, using the speaker dependent template, detects receipt of the predetermined keyword, it then notifies processor 320, which prepares the ASR unit 210 for speaker carryover. The foregoing continues in the manner described until either the TDD user or unimpaired speaker terminates the call, at which point the various ACD 205, network 100 and CO connections are terminated.

As another aspect of the invention, a TDD user who can hear but cannot speak may invoke a calling state option referred to above as "hearing carryover" if the TDD terminal is a BAUDOT terminal. Specifically, and referring once again to FIG. 3, if the TDD user invokes hearing carryover, then the control messages entered by the attendant causes the unimpaired speaker and TDD user to be respectively connected to ports 1 and 2 of an available TTS unit 215. In addition, and in the manner noted above, AP 225 sends to processor 415 of the selected TTS unit 215 a message identifying the call as "hearing carryover". Upon receipt of that message, processor 415 "toggles" switch 405 to disconnect the associated terminals 1 and 2 and toggles switch 435 to establish a connection between its associated terminals 1 and 3. Processor 415 then sends to the TDD terminal via path 417 and modem 430 a message containing the predetermined keyword. Following that task, processor 415 again toggles switch 435 to establish a connection between its associated terminals 1 and 2. Accordingly, then, the selected TTS unit 215 is structured to translate into speech TDD text received via port 2 and to deliver the results to port 1 for delivery to the unimpaired speaker. Similarly, TSS unit 410 notifies processor 415 via lead 412 upon receipt of text defining the predetermined keyword. At that point, processor 415 prepares its associated TSS unit for hearing carryover. Processor 415 does this by causing terminals 1 and 2 of switch 405 to be connected to one another, thereby establishing a bridge between TTS ports 1 and 2 so that the unimpaired speaker's voice may be delivered directly to the TDD user via the aforementioned connections.

When the TDD user responds and begins to enter text via the associated TDD terminal, then such text is delivered to the input of TSS 410 via port 2, modem 430 and switch 403. Upon detecting the receipt of such text, TSS 410 notifies processor 420, which then, terminates hearing carryover by disconnecting terminals 1 and 2 of switch 405. Similarly, TSS 410 translates the received text into speech and outputs the result to port 1 for delivery to the unimpaired speaker. The foregoing continues in the manner described until either the TDD user or unimpaired speaker terminates the call, at which point the various ACD 205, network 100 and CO connections are terminated.

It is to be understood of course that the foregoing calls could be originated by the unimpaired speaker. However, to ensure successful completion of such a call, the called TDD terminal would have to be adapted to convert ringing signals that is receives into a signal that the TDD user may recognize, for example, a visual signal. If those conditions are met, then a call originated by an unimpaired speaker to a TDD terminal may be processed similar to the way that a call that is originated by a TDD user is processed.

As mentioned above, heretofore, a TDD user could not take advantage of enhanced services, such as, for example, the voice messaging service 115 offered by AT&T (FIG. 1). However, as a result of DPRS system 200 (FIG. 1), a TDD terminal user, for the first time, may take advantage of such services, in which a DPRS attendant interacts with the desired enhanced service, e.g., VMS 115 on behalf of the TDD user, as discussed below.

Specifically, and assuming that the TDD user has established a connection to DPRS 200, the TDD user responsive to receipt from the attendant a request for the telephone number of the called party enters via the TDD terminal "voice messaging service" or "VMS". The attendant responsive to receipt of that message interacts with the TDD user to obtain, inter alia, billing information (i.e., whether the VMS call is to billed to the calling telephone number or a credit card number), the name of the calling party, identity and telephone number of the called party.

Following such interaction, the attendant then establishes a DPRS billing record by sending to AP 225 via LAN 230 a copy of the information received from the TDD terminal and the fact that the call is a VMS call. The attendant then directs ACD 205 to connect an available TTS unit, e.g., unit 215-1 to the TDD user and "conference in" the attendant terminal. The attendant then directs AP 205 via LAN 230 to place TSS unit 215-1 in the aforementioned "carryover" state, in which TDD text received at TSS unit 215-1 is passed to AP 205 via LAN 230 for storage in memory 226.

The reason for storing such text, rather than directly passing to VMS 115 a voice synthesized version of the text as it is received, is based on observations which indicate that a TDD user typically requires an appreciable amount of time to compose and type in a message. That is, a TDD user typically pauses for an appreciable amount of time between entering words of the desired text. A voice message having very long pauses distributed throughout the message may render it somewhat confusing to an intended listener. To counter the effect of such pauses, DPRS system 200 is arranged, in accordance with an aspect of the invention, to collect and store a TDD message that is composed for VMS service 115, and then deliver to VMS 115 a voice synthesized version of the stored message that is virtually free of such long pauses.

Continuing, once the TDD user is connected to a TTS unit 215-1, then the attendant may disconnect the associated terminal 220 from the telephone connection. However, before doing so, the attendant turns control of the connection to the TDD user by sending thereto for display at the TDD terminal the key word message, e.g., "*over". Upon receipt of that message, the TDD user may then begin to enter via the TDD terminal, e.g., terminal 15, the text of the message that the user desires to send via VMS 15, in which each word of the text is transported to TTS unit 215-1, in the manner described above.

When a word of text is received at TTS unit 215-1, the associated processor 415 stores the word in RAM 425 (FIG. 4). When a sufficient number of the text words have been stored in RAM 425, processor 415 unloads them from RAM 425 and forms a so-called data packet comprising an information field and header field. The header contains, inter alia, a so-called channel number, which identifies a LAN 230 data channel that TTS unit 215-1 uses to communicate with AP 225. The information field contains, inter alia, the address of TTS unit 215-1 and the text words unloaded from RAM 425. Processor 425 then sends AP 225 via LAN 230 the formed data packet. AP 225, in turn, stores in a memory 226 record associated with the VMS call the text words contained in the received data packet.

Processor 425 continues operating in the foregoing manner until it receives from the TDD caller the key word "*over". At that point, processor 425 forms a data packet from the stored text words and inserts in the packet as the last data byte in the information field a terminator, such as, for example, an end of file (eof). Processor then sends the packet to AP 225 via LAN 230 for storage in memory 226. AP 225, upon detecting the eof in the received data packet, sends to ACD 205 a third-party call control message requesting disconnection of the associated TTS unit 215-1 from the call and reconnection of an available attendant terminal.

ACD 205, in turn, disconnects TTS unit 215-1 from the connection extending to the TDD terminal 15 and reconnects an available attendant terminal, e.g., terminal 220-2. In doing so, ACD 205 sends to AP 225 via communication path 227 a message identifying an available attendant terminal (220-2) that may be used to complete the transaction. AP 225, armed with that information, sends, via LAN 230, for display at that attendant terminal the VMS record associated with the TDD call.

The attendant at terminal 220-1, in turn, sends to the user's TDD terminal for display thereat a message indicating that the message will be forwarded to VMS 15 for delivery to the intended recipient. The attendant then causes ACD 205 to terminate the connection to the TDD terminal.

Following the foregoing, the attendant then establishes a connection to VMS 115 via ACD 205 and network 100. The attendant does this by sending to ACD 205 a request for an outgoing telephone line, or port circuit, e.g., line 101-1. Upon receiving dial tone, the attendant then dials the telephone number (e.g., 1-800-NXX-XXXX) associated with VMS 115. Network 100 responsive to receipt of the VMS 115 telephone number establishes via one or more network 100 toll switches (not shown) a connection between telephone line 101-1 and VMS 115.

Following a prerecorded VMS welcome announcement, the attendant at terminal 220-2 responsive to individual voice instructions transmitted by VMS 115, states the name of the calling TDD user and then enters via a dual-tone-multifrequency keypad associated with the attendant terminal the billing information, and called telephone number. VMS 115 then plays an announcement requesting entry of the voice message. At that point, the attendant directs ACD 205 to connect the outgoing VMS call, i.e., outgoing telephone line 101-1, to an available TSS unit, e.g., TSS unit 215-1, as shown in FIG. 6. As mentioned above, ACD 205 sends to AP 225 via communication path 227 a message detailing a connection established by ACD 225. As also mentioned above, AP 225 maintains in memory 226 records characterizing active connections established by ACD 225. Accordingly, upon receipt from the attendant at terminal 220-2 a message requesting output of the stored VMS message, AP 225 sequentially unloads from memory 226 a predetermined number of the stored text words and forms them into a data packet. AP 225 then sends to processor 415 (FIG. 3) of TTS unit 215-1 via LAN 230 the formed packet. Processor 415 stores in RAM 425 the text words contained in the information field of the received packet. Processor 415 then sequentially unloads the text words from RAM 225 and presents each such text word to the associated TSS unit 410 for conversion into speech. As mentioned above, the output of TSS unit 410 is presented to port 1 (401) of the associated TTS unit, which, in the instant illustrative example, is connected to VMS 115 via ACD 205 path 209 and network 100 path 103. VMS 115 stores such speech in associated memory as it is received.

The foregoing continues until processor unloads from RAM memory 225 a text word indicative of the eof terminator. At that point, processor 415 sends to AP 225 a disconnect message. AP 225, in turns, sends to ACD 205 a message requesting disconnection of TTS unit 215-1 and reconnection of an attendant terminal to outgoing telephone line (trunk) 101-1. Assuming that ACD 205 connects attendant terminal 215-1 to outgoing line 101-1, then AP 225 sends to that terminal for display thereat a message containing the stored VMS record and an indication that the VMS message transmission has been completed. The attendant at terminal 215-1 responsive to the displayed message enters via the associated key pad a predetermined digit to signal VMS 115 that entry of the voice message has been completed. VMS 115 responsive to receipt of that digit returns a pre-recorded announcement requesting whether the message is to be delivered in accord with either a standard or special delivery schedule.

In contemplation of the invention, VMS messages originated by a TDD user is afforded standard delivery as a means of containing the cost of dual party relay services. Accordingly, in response to the delivery schedule announcement, the attendant at terminal 215-1 enters via the associated terminal key pad a digit corresponding to the standard delivery schedule. Upon receipt of that digit, VMS 115 disconnects from the call. However, before doing so, VMS 115 schedules delivery of the received voice message within two hours of the termination of the call. Similarly, ACD 205 upon detecting that VMS 115 has disconnected, terminates the connection established by path 209, thereby making terminal 215-1 available for use on another TDD call.

Alternatively, the TDD user's file stored in memory 226 could be delivered to an attendant associated with the enhanced Language Line (LL) service 120, shown in FIG. 1. In that event, the DPR attendant may establish a telephone connection to LL 120 and request the services of an LL 120 attendant conversant in a foreign language priory requested by the TDD user. When the appropriate LL 120 attendant is added to the call, the DPR attendant may pass to the former attendant the particulars associated with the stored file as well as the stored file. At that point, the LL 120 attendant may establish a telephone connection to the party identified by the TDD user and then verbally translate the contents of the file into the designated language for benefit of the called party.

Alteratively, the LL attendant may send to the enhanced facsimile service 125 a copy of the translated file for delivery to the designated party. In the latter instance, the TDD user would supply to the DPR attendant the telephone number of the facsimile machine which is to receive the file, which number would be passed to the LL 120 attendant. The LL 120 attendant would then pass that telephone number to EFAX service 125 along with a copy of the file translated into the desired language. EFAX 125 would then establish a telephone connection to the station identified by the telephone number and would supply the translated file to that station via the telephone connection. The station facsimile machine would print out a hard copy of the file as it is being received.

The foregoing is merely illustrative of the principles of the invention. Those skilled in the art will be able to devise numerous arrangements, which, although not explicitly shown or described herein, nevertheless embody those principles and are within its spirit and scope.

We claim:

1. A telecommunications system having a plurality of attendant terminals comprising
   at least one text-to-speech synthesizer unit operative for translating text received via an associated second port into speech for delivery to an associated first port,
   means, responsive to receipt at one of said attendant terminals a request identifying a called telephone station, for establishing a first telephone connection to said called telephone station in accordance with an instruction entered into said one attendant terminal, said request being entered via a second telephone connection extending to a data terminal operated by a sound impaired person,
   means, responsive to said instruction, for extending said first connection to said first port of said one text-to-speech synthesizer and for extending said second telephone connection associated with said data terminal to said second port of said text-to-speech synthesizer, and
   means, contained in said synthesizer and responsive to receipt of a predetermined key word via said second connection, for causing said first connection to be connected to an available one of said attendant terminals so that an attendant associated with said one terminal may convert speech signals received via said first connection into text for delivery to said second connection via said second port of said one text-to-speech synthesizer.

2. The system set forth in claim 1 further comprising a local data network, each of said attendant terminals and said at least one text-to-speech synthesizer unit being interconnected to one another via said local data network.

3. The system set forth in claim 1 further comprising means responsive to receipt of said predetermined key word via said first connection for then causing said first connection to be disconnected from said available terminal and reconnected to said first port of said text-to-speech synthesizer.

4. The system set forth in claim 1 wherein if said sound impaired person is a person having a speech impairment but not a hearing impairment, then said means for causing, responsive to said predetermined key word, invokes means for establishing a communications path between said first and second ports of said one text-to-speech synthesizer unit so that speech signals received via said first connection and said first port may be supplied directly to said impaired person via said second port and said second connection.

5. The system set forth in claim 4 further comprising means responsive to receipt of said predetermined keyword via said first port of said text-to-speech synthesizer unit for then disconnecting said communications path between said first and second ports.

6. The system set forth in claim 1 further comprising
   at least one automatic speech recognition unit having an input terminal and an output terminal, said automatic speech recognition unit being operative for translating received speech into respective text based on a predetermined template of words associated with a speaker, said speaker being associated with said called telephone station, and
   wherein, in the event that said sound impaired person is a person that is hearing impaired but not speech impaired, then, in that event, said means for establishing and extending extends said first connection to said input terminal of said one automatic speech recognition unit, rather than to said first port of said one text-to-speech unit, and extends said second telephone connection associated with said data terminal to said output terminal of said automatic speech recognition unit so that said automatic speech recognition unit may convert speech signals received via said input terminal into text for delivery to said output terminal and thence to said data terminal.

7. The system set forth in claim 2 further comprising at least one automatic speech recognition unit having a connection to said local data network and being operative for translating speech signals received via an associated input into respective text for delivery to said local data network, said translation being based on a predetermined template of words associated with a speaker, said speaker being associated with said telephone station, wherein said means for causing and extending includes means, responsive to receipt of said predetermined key word, for transferring said first connection to said associated input of said one automatic speech recognition unit so that speech received via said first connection may be translated into respective text and supplied to said second port of said one text-to-speech unit via said local data network for delivery to said data terminal.

8. The system set forth in claim 7 wherein said means for transferring including means, responsive to receipt of said predetermined key word via said first connection, for then causing said first connection to be disconnected from said associated input of said one automatic speech recognition unit and reconnected to said first port of said one text-to-speech unit.

9. The system set forth in claim 7 wherein said means for transferring including means, responsive to an absence of speech being received via said first connection for a predetermined period of time, for then causing said first connection to be disconnected from said associated input of said one automatic speech recognition unit and reconnected to said first port of said one text-to-speech unit.

10. A telecommunications system having a plurality of attendant terminals comprising
at least one text-to-speech synthesizer,
means, responsive to receipt of a request and associated text at one of said attendant terminals, in which said request identifies at least a telephone station and an enhanced communications service, for storing in a memory via a path including a local data network said request and associated text, said request and said text being received from a data terminal connected to a communications path extending to said one attendant terminal, said data terminal being operated by a sound impaired person, and
means thereafter operative for establishing another communications path to said enhanced service and supplying the identification of said telephone station to said enhanced service via said other communications path, and wherein said means for establishing includes means for passing said stored text through said text-to-speech synthesizer and for supplying the resulting speech signals to said enhanced service via said other communications path.

11. The system set forth in claim 10 wherein said enhanced service is a voice mail service.

12. The system set forth in claim 10 wherein said enhanced service is a language translation service.

13. The system set forth in claim 10 wherein said means for passing includes means operative in the event that said enhanced service is a facsimile service for then causing said stored text to be supplied directly to said enhanced service.

14. A dual party relay communications system comprising
a plurality of attendant terminals,
at least one text-to-speech synthesizer unit operative for translating text received via an associated second port into speech for delivery to an associated first port,
means, responsive to receipt of a telephone call associated with a first communications path established by a data terminal operated by a sound impaired person, for establishing a second communications path to a telephone station and for respectively extending to said first and second ports said second and first communications paths so that text received from said data terminal may be translated into speech for delivery to said second communications path, said second communications path being established in accordance with a request received from said data terminal, and means, responsive to receiving text indicative of a predetermined key word from said data terminal, for causing said second communications path to be transferred to an available one of said attendant terminals so that an attendant associated with said available terminal may translate speech received via said second communications path into text for delivery to said data terminal via said first communications path.

15. The system set forth in claim 14 further comprising means responsive to receiving said predetermined key word via said second communications for then causing said second communications path to be disconnected from said available attendant terminal and reconnected to said first port of said one text-to-speech synthesizer.

16. The system set forth in claim 14 wherein if said sound impaired person is a person having a speech impairment but not a hearing impairment, then said means for causing, responsive to said predetermined key word, invokes means for establishing a connection between said first and second ports of said text-to-speech synthesizer unit so that said speech received via said first port may be supplied directly to said impaired person via said second port and said first communications path.

17. The system set forth in claim 16 further comprising means responsive to receipt of said predetermined key word via said first port of said text-to-speech synthesizer unit or text received via said second port, for then terminating said direct connection between said first and second ports.

18. The system set forth in claim 14 wherein said system further comprises means, operative in the event that text is not received from said data terminal for a predetermined period of time, for then invoking said means for causing said transfer.

19. The system set forth in claim 14 further comprising
at least one automatic speech recognition unit operative for translating received speech into respective text based on a predetermined template of words associated with a speaker, said speaker being associated with said telephone station,
wherein, in the event that said sound impaired person is a person that is hearing impaired but not speech impaired, then, in that event, said means for establishing and extending extends said second communications path to one input of said one automatic speech recognition unit, rather than to said first port of said one text-to-speech unit, and extends said first communications path associated with said data terminal to another input of said automatic speech recognition unit so that text indicative of speech received via said one input may be supplied to said other input for delivery to said data terminal.

20. The system set forth in claim 14 further comprising
a local data network, and
at least one automatic speech recognition unit operative for translating received speech into respective text based on a predetermined template of words associated with a speaker, said speaker being associated with said telephone station, wherein said means for transferring includes means, responsive to receipt of said predetermined key word, for causing said second communications path to be transferred to an input of said one automatic speech recognition unit so that speech received via said second communications path may be translated into respective text and supplied to said second port of said one text-to-speech unit via said local data network for delivery to said data terminal via said first communications path.

21. The system set forth in claim 20 wherein said means for transferring to said input of said automatic speech recognition unit including means, responsive to receipt of said predetermined keyword via said second communications path, for then causing said second communications path to be disconnected from said input of said one automatic speech recognition unit and reconnected to said first port of said one text-to-speech unit.

22. The system set forth in claim 20 wherein said means for transferring to said one automatic speech recognition unit including means, responsive to an absence of speech being received via said second communications path for a predetermined period of time, for then causing said second communications path to be disconnected from said input of said one automatic speech recognition unit and reconnected to said first port of said one text-to-speech unit.

* * * * *